(12) United States Patent
Boryskin et al.

(10) Patent No.: US 12,452,726 B2
(45) Date of Patent: Oct. 21, 2025

(54) METHOD FOR CALCULATING CAPABILITIES OF WIRELESS BRIDGE, COMMUNICATION SYSTEM, AND WIRELESS BRIDGE

(71) Applicant: MITSUBISHI ELECTRIC CORPORATION, Tokyo (JP)

(72) Inventors: Artem Boryskin, Rennes (FR); Herve Bonneville, Rennes (FR); Nicolas Gresset, Rennes (FR)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 272 days.

(21) Appl. No.: 18/273,414

(22) PCT Filed: Sep. 28, 2021

(86) PCT No.: PCT/JP2021/036538
§ 371 (c)(1),
(2) Date: Jul. 20, 2023

(87) PCT Pub. No.: WO2022/201605
PCT Pub. Date: Sep. 29, 2022

(65) Prior Publication Data
US 2024/0107364 A1 Mar. 28, 2024

(30) Foreign Application Priority Data
Mar. 20, 2021 (EP) ..................... 21305345

(51) Int. Cl.
*H04W 28/02* (2009.01)
*H04L 47/83* (2022.01)
*H04W 28/08* (2023.01)

(52) U.S. Cl.
CPC ......... *H04W 28/0268* (2013.01); *H04L 47/83* (2022.05); *H04W 28/0958* (2020.05)

(58) Field of Classification Search
None
See application file for complete search history.

(56) References Cited

U.S. PATENT DOCUMENTS

| 2022/0030530 A1* | 1/2022 | Munz | H04J 3/0667 |
| 2022/0104062 A1* | 3/2022 | Aijaz | H04W 28/0268 |
| 2023/0291692 A1* | 9/2023 | Bonneville | H04L 47/2491 |

FOREIGN PATENT DOCUMENTS

| WO | WO 2020/035127 A1 | 2/2020 |
| WO | WO 2020/036911 A1 | 2/2020 |
| WO | WO 2021/013338 A1 | 1/2021 |

OTHER PUBLICATIONS

Japanese Office Action for Japanese Application No. 2023-555877, dated Mar. 26, 2024, with English translation.

(Continued)

*Primary Examiner* — June Sison
(74) *Attorney, Agent, or Firm* — Birch, Stewart, Kolasch & Birch, LLP

(57) ABSTRACT

The disclosure relates to a method for calculating capabilities of a WB in a communication system within a TSN network. The WB comprises at least a UPF, a BS and a UE. The UPF comprises at least one NW port enabling communication between said BS and a first subnetwork. The UE is wirelessly connected, within the TSN network, to said BS, and comprises a DS port enabling communication with a second subnetwork. The method is performed at the WB and comprises estimating a performance capacity of the wireless connection between the BS and the UE based on information related to an intended network usage for time-sensitive communication at the WB, and calculating the TSN capabilities of the WB corresponding to the estimated performance capacity. The disclosure further relates to a corresponding communication system.

15 Claims, 4 Drawing Sheets

(56) References Cited

OTHER PUBLICATIONS

International Search Report (PCT/ISA/210) issued in PCT/JP2021/036538, dated Jan. 18, 2022.
Written Opinion of the International Searching Authority (PCT/ISA/237) issued in PCT/JP2021/036538, dated Jan. 18, 2022.

* cited by examiner

METHOD FOR CALCULATING CAPABILITIES OF WIRELESS BRIDGE, COMMUNICATION SYSTEM, AND WIRELESS BRIDGE

TECHNICAL FIELD

The disclosure belongs to the field of telecommunications. It generally relates to a method and system for Time Sensitive Networking (TSN) and, more specifically, to a TSN network comprising a wireless bridge, such as 5G system (5GS).

In particular, there are disclosed a method for calculating capabilities of a wireless bridge in a time-sensitive network and a corresponding communication system and wireless bridge thereof.

BACKGROUND ART

Fast and reliable communication & information networking and, in particular, the time sensitive networking (TSN) is essential for a smart factory environment. It allows integration across the factory by closely connecting the individual production steps as well as production planning and logistics.

To provide the sought connectivity, the industrial networks need to support various types of traffic, including time sensitive (TS) traffic used for real-time control over the machines and services that require deterministic performance.

Time sensitive networking (TSN) is standardized by IEEE 802.1Q to provide industrial networks with deterministic delay to handle TS traffic. The end-to-end communication deadlines and bounded jitter are guaranteed through a number of mechanisms such as time synchronization and TSN scheduling of individual frames and streams, e.g. in terms of per-stream and per-port gate control lists generated for all components within the network.

Initially, TSN networking was intended for wireline networks, capable of supporting the high-speed communication between sensors, actuators, controllers and IT centers. Moving from wired to wireless sensors and actuators provide additional advantages, such as mobility, scalability, and reduced maintenance cost. To connect the wireless devices to a TSN network, wireless transmission technologies such as the ones defined in 3GPP are necessary.

The integration between the wired and wireless technologies raises a number of challenges that are not fully resolved yet, such as the standards compatibility as well as the peculiarities of data transmission through the (bounded) wired and (open) wireless media.

The particular compatibility issue between wired and wireless technologies addressed by this invention is related to the variable throughput capacity (or bandwidth) of wireless bridges that may alter deterministic latency experienced by data streams passing through 5GS.

Although the description of the wireless bridge (WB) below is focused on 3GPP/5G networks, it may be generalized to any wireless communication system.

Some TSN scheduling and routing use cases are computationally complex and require time-consuming computation of the per-stream and/or per-port gate control lists for each component within the entire TSN network. To accommodate this sort of use cases, it is beneficial to centralize the computations in a single centralized entity capable of gathering information about the entire network in order to find the best network configuration and the schedule for each component therein. Such a model is commonly referred as Centralized.

As defined by IEEE 802.1Qcc standard, according to the centralized model, a Centralized User Configuration (CUC) entity (1) discovers (11) end stations (ES) (2), retrieves (12, 13) the TSN capabilities of these end stations and user requirements, in other words traffic specifications at these end stations, and configures (14) TSN features in said end stations. The configuration information is then provided (15) to a Centralized Network Configuration (CNC) entity (3) that discovers (16) the physical topology (i.e. links and bridges) of the TSN network (4), reads (17) the TSN capabilities of all said bridges, then generates (18) a schedule, and if successfully done, configures (19) all bridges for TS communication. In order to fulfil this task, the CNC needs a complete view of the physical topology of the network as well as of the TSN capabilities of all bridges.

In case where the CNC may not find a TSN scheduling that satisfies requirements for all stream requests obtained through the CUC, a new iteration of the TSN configuration loop is initiated (20) through adjusting the initial stream requests. Such a configuration loop proposed for wireline TSN as defined by IEEE 802.1Qcc standard is schematically shown in FIG. 1 and followed by a detailed workflow description provided in FIG. 2.

The embodiment in FIG. 1 assumes that the network physical topology and the TSN capabilities of all components (=bridges) are fixed and known before the TSN scheduling is determined. The static nature of the wired components, and in particular the fixed bandwidth, allows CNC to read the network physical topology and the wired TSN bridge capabilities only once and then use these data for TSN scheduling procedure whatever the number of iterations is required to generate a successful TSN scheduling corresponding to the initial (or adjusted) stream request.

On the contrary, in case of a wireless bridge, such as 5GS, the throughput capacity of its internal wireless links is not fixed. Instead, it depends on radio resource (RR) allocation scheme used by 5GS and on the interdependent repartition of said RR between wireless devices competing for said RR: the more resource is provided to one link, the less resource remains available for the other(s).

On the one hand, the ability of a wireless bridge (WB) to adjust the links throughput capacity according to the traffic load by choosing an appropriate internal configuration provides an important advantage compared to wired TSN bridges. On the other hand, the optimization problem of computing said appropriate repartition of the limited RR between WBs requires prior knowledge about the future traffic load that is not available at the time when 5GS is requested to declare its TSN capabilities. This creates a Chicken-Egg problem that complicates 5GS/TSN integration.

Indeed, in case of a WB, all internal radio links pass through a shared wireless medium. To avoid cross-talk between different ports due to collisions in the wireless medium, and because of variations of the radio channel in space and in time, different radio resource allocation and time/frequency multiplexing techniques are used resulting in different TSN capabilities of the WB.

This makes the standard TSN network scheduling procedure represented in FIG. 2 inefficient at least in what concerns the selection of an appropriate internal configuration of WB among different possible ones available through different RR allocations.

Without a prior knowledge of its intended use, the TSN capability of WB may only be defined based on a hypothetical worst case scenario, rather than the actual traffic load. Such a "blind guess" may cause additional delays and jitter for streams passing through 5GS. This may potentially be avoided by an appropriate selection of WB internal configuration.

The prior art does not teach how to resolve this issue which remains intrinsic for all TSN networks comprising a wireless bridge, characterized in having variable TSN capabilities associated with different resource allocation that may be used by said WB to support a given traffic load which is not yet defined at the time of TSN capability declaration.

In particular, NPL 1 teaches that "The interface between the 5GS and the CNC allows for the CNC to learn the characteristics of the 5G virtual bridge", however it does not explain whether and how these characteristics are estimated and guaranteed for a traffic load that is not yet defined at the time when 5GS is requested by CNC to declare its TSN capabilities.

In PTL 1, a solution enabling communication between a 3GPP WB and IEEE TSN network is proposed based on the use of a TSN network translator (TT) proposed to enable bi-directional communication between 5GS and TSN network for both the control and data information, thanks to conversion of the TSN data (e.g. encoded according to IEEE 802.1) in terms of internal specification parameters understood by a WB (e.g. defined by 3GPP) and vice-versa. In particular, this allows CNC to deal with 5GS as with a virtual TSN bridge having the same properties as a standard wired TSN bridge. The use of TT simplifies integration between TSN and 5GS but it does not resolve the issue related to the variable TSN capability of 5GS.

In PTL 2, this issue is partly resolved by proposing an iterative optimization procedure characterized in sequential assessment of different possible internal configurations of 5GS and selection of a best configuration among the tested ones, based on a figure of merit function associated at least with the degree of success of the TSN scheduling procedure executed by CNC. This procedure results in improved overall performance of the TSN network comprising 5GS, however, it does not teach how 5GS may anticipate the traffic load that may potentially lead to a longer optimization time.

There is therefore a need for providing 5GS with means for predicting its intended use (and, in particular, for anticipating the traffic load per port). Such predictions may help to resolve the Chicken-Egg problem and thus allow for more efficient integration between wireless and wireline networks.

CITATION LIST

Patent Literature

PTL 1
International patent application WO2020/081062A1.
PTL 2
European patent application EP20306136.1 (yet unpublished).

Non Patent Literature

NPL 1
J. Farkas et al. 5G-TSN integration for industrial automation, Ericsson Tech. Review, 2019.

NPL 2
A. Boriskin and R. Sauleau, Hybrid genetic algorithm for fast electromagnetic synthesis, Book chapter in Real-world applications of genetic algorithms, O. Roeva (ed), IntechOpen, 2012, DOI: 10.5772/38099.
NPL 3
A. Galan, R. Sauleau, and A. Boriskin, Floating boundary particle swarm optimization algorithm. Optim. Lett. 7, 1261-1280 (2013), DOI:10.1007/s11590-012-0502-8.

SUMMARY OF INVENTION

The invention is defined by the appended independent claims. Additional features and advantages of the concepts herein disclosed are set forth in the description which follows.

The present disclosure aims at improving the situation.

To this end, the present disclosure describes a method for calculating capabilities of a wireless bridge (WB) in a communication system within a time-sensitive network comprising a first subnetwork and a second subnetwork, the communication system comprising the wireless bridge and further comprising at least two end stations (ES), the wireless bridge comprising at least one user plane function entity (UPF), at least one base station (gNB) and at least one user equipment (UE), said at least one user plane function entity comprising at least one network-side port (NW) enabling communication between the at least one base station and the first subnetwork, said at least one user equipment being wirelessly connected, to said at least one base station, said at least one user equipment comprising at least one device-side port (DS) enabling communication with the second subnetwork, at least one of the at least two end stations being connected to a corresponding device-side port of a corresponding user equipment, said method being performed at the wireless bridge and comprising:

estimating a performance capacity of the wireless connection between the at least one base station and the at least one user equipment based on information related to an intended network usage for time-sensitive communication at the wireless bridge, and calculating the TSN capabilities of the wireless bridge corresponding to the estimated performance capacity In the context of the disclosure, the wireless bridge is to be understood as a network bridge which internal links, connecting at least one base station to at least one user equipment, are wireless.

In the context of the disclosure, a performance capacity is to be understood as comprising a throughput capacity and/or a capacity in terms of at least one quality-of-service parameter such as delay, latency, jitter and the like.

The proposed method enables a more accurate and reliable calculation of the WB TSN capabilities compared to the prior art methods, which do not conduct any prediction, or estimation, of any form of actual future traffic load at the WB, and which only rely, instead, on a hypothetical worst-case scenario.

As a consequence, the more accurately and reliably calculated WB TSN capabilities may be used in general to improve quality-of-service and, in particular, to reduce dependent delays per port pairs of WB. The delay induced by a network device to handle data packets is the sum of an independent delay, which is the part of said delay which is unaffected by the amount of data to handle, and of a dependent delay which, on the contrary, is the part of said delay which depends on the amount of data to handle. Reducing these dependent delays is key to help reducing overall delays for communications between end stations (e2e delays), at least for the streams passing through the WB. Additional advantages include:

- a reduced time needed by CNC for finding an appropriate internal configuration of the WB that may best serve the needs of ES whose data flows may pass through the WB, considering this scheduling task may be very time consuming or even impossible if done by a brute force optimization,
- a more efficient integration between wired and wireless networks/bridges, and
- an improved interoperability and access to the market for off-the-shelf hardware products from different vendors achieved thanks to the proposed method of subnetwork discovery that may be executed by WB autonomously with no (or limited) help from CUC and/or CNC.

Optionally, estimating a performance capacity of the wireless connection between the at least one base station and the at least one user equipment based on information related to an intended network usage for time-sensitive communication at the wireless bridge comprises:

- obtaining the information related to the intended network usage for time-sensitive communication at the wireless bridge,
- based on the obtained information, generating a quality-of-service template representing a performance metric corresponding to said intended network usage for time-sensitive communication at the wireless bridge, and
- estimating the performance capacity of the wireless connection between the at least one base station and the at least one user equipment based on the generated quality-of service-template.

In the context of the invention, the quality-of-service template defines a desired performance metric, such as a parameter related to quality-of-service (QoS), or related to an application quality-of-service policy (AQP), for example on a per DS-port basis, on a per stream basis, or on any other basis that can be mapped to the per-port-pair basis used for definition of the bridge TSN capabilities, e.g. per UE, per port pair, etc).

In a first example, the quality-of-service template is based on equal sharing: the same performance metric is set for each port, stream or user equipment. Equal sharing may be used as a default option in case the information related to the intended network usage is scarce.

In a second example, the quality-of-service template is based on balanced sharing specifically on a per port, per stream or per user equipment basis. Balanced sharing may be used as a refined option in case the information related to the intended network usage is differentiated on said per port, per stream or per user equipment basis. Such sharing may for example be balanced based on a subnetwork discovery. Subnetwork discovery may apply to the first subnetwork (or upstream subnetwork) or to the second subnetwork (or downstream subnetwork). The downstream subnetwork is an isolated subnetwork of the TSN network which is associated with the device side port(s) of the WB, which comprises at least one end station (ES), and which has no bypass connection (neither wired, nor wireless) with the upstream subnetwork, which is associated with the network side port(s) of the WB. Conducting a subnetwork discovery means obtaining information related at least to the number of ESs within the corresponding subnetwork and using this information for anticipating the traffic load per UE/DS port.

Optionally, the method further comprises, for at least one port, determining a performance indicator associated to said port in at least one operation mode, and generating the quality-of-service template is further based on each determined performance indicator. Operation modes are understood as including downlink and/or uplink modes.

In a first example, two ES are located in the downstream subnetwork and communicate in unidirectional downlink mode (as an exemplary operation mode) through a corresponding DS port of a corresponding UE, while at least one ES is located in the upstream subnetwork and is accessible through a gNB. The WB thus supports two wireless links between said gNB and, respectively, the two UE competing for radio resources. According to such example, a QoS template may be based on a traffic load per UE, and the TSN capability per WB port pair may be defined as a function of the corresponding wireless link bandwidth.

In a second example, an ES is located in the downstream subnetwork and communicates in bi-directional Down/Up link mode (as another exemplary operation mode) with another ES located in the first subnetwork. Communication between these ES is performed, in the WB, through a wireless link between a single gNB and a single UE. The two modes may for example share a resource in time-domain. Indeed, in many cases, UE cannot support down and up links simultaneously. According to this second example, it is possible to define, as a QoS template, a traffic load repartition between the Down and Up link modes, in time-domain, further mapped to a frequency domain in terms of bandwidth repartition. Then, the TSN capability of the WB for the down and up links may be defined as a function of the fractional bandwidth allocated for the down and up links.

Hereafter are presented various options of obtaining information about the intended network usage, in view of generating a QoS template or directly in view of estimating a performance capacity of the wireless connection between the at least one base station and the at least one user equipment. These options may of course be combined.

Optionally, the time-sensitive network further supports, for example comprises, a centralized user configuration entity (CUC) configured to communicate with the end stations, and the method further comprises obtaining at least part of said information related to the intended network usage for time-sensitive communication at the wireless bridge based on a communication between the centralized user configuration entity and at least one of the end stations. This information may be obtained for instance from a communication between the wireless bridge entity and the centralized user configuration entity. Alternately, this information may be obtained at the wireless bridge entity by intercepting signaling messages exchanged between the centralized user configuration entity and at least one of the end stations. Alternately, such information related to the intended network usage for time-sensitive communication at the wireless bridge may be obtained based on a communication between the wireless bridge entity acting as the centralized user configuration entity and at least one of the end stations. In other words, in such case, it is not a requirement that the time-sensitive network further comprises a centralized user configuration entity. Instead, the wireless bridge entity may emulate the centralized user configuration entity with respect to the end stations.

Communication between CUC and ES allows retrieving for example identification (e.g. MAC addresses) of ES, types of ES, or traffic specifications.

Optionally, the time-sensitive network further supports, for example comprises, a centralized network configuration entity (CNC) configured to perform a network discovery according to the centralized TSN model, the method further comprising obtaining at least part of said information related to the intended network usage for time-sensitive communication at the wireless bridge based on said network discovery. Information about the network discovery may be obtained for instance from a communication between the wireless bridge entity and the centralized network configuration entity. Alternately, this information may be obtained at the wireless bridge entity by intercepting signaling messages exchanged between the centralized network configuration entity and at least one of the end stations to perform the network discovery. Alternately, the wireless bridge acting as the centralized network configuration entity may itself perform such a network discovery. In other words, in such case, it is not requirement that the time-sensitive network actually comprises a centralized network configuration entity (CNC). Instead, the wireless bridge entity may emulate the centralized network configuration entity with respect to the end stations.

CNC-like network discovery, that is to say according to the centralized TSN model, allows retrieving the physical topology of at least a subnetwork of the TSN network and/or the TSN capabilities of the links and bridges in said subnetwork.

Optionally, the time-sensitive network further comprises a plurality of TSN bridges connecting the end stations to the wireless bridge, at least one of said TSN bridges being configured to perform network discovery according to the distributed TSN model, and the method further comprises obtaining at least part of said information related to the intended network usage for time-sensitive communication at the wireless bridge based on said network discovery.

Bridge-like network discovery, that is to say according to the distributed TSN model, also allows obtaining a topology of the downstream subnetwork for example, as well as TSN capabilities of any ES connected to a given bridge.

Optionally, obtaining said at least part of information is by receiving a communication emitted by the configuration entity and destined to the wireless bridge.

Indeed, the WB may be configured for example to request physical or MAC addresses of the ES in the TSN network from the CUC, or to request an indication of the topology of the upstream and/or downstream subnetwork from the CNC. Direct communication with CUC and/or CNC allows the WB to get at least partial information about stream requests (from CUC) and network topology (from CNC). It shall be noted that at the time of such exchange between the CNC/CUC and the WB, the CNC is not yet capable of computing a TSN scheduling due to the lack of information about the TSN capabilities of the WB, thus the path of the streams is not yet determined, hence the wording 'partial information' in the previous sentence.

Optionally, obtaining said at least part of information is by intercepting a communication emitted by the configuration entity and destined to at least one end station.

Intercepting, at the WB, a message from the CUC or from the CNC, passing through WB and originally intended to a given ES in the downstream subnetwork, allows stealthily and seamlessly obtaining information related to the intended network usage. Such interception allows the WB to passively estimate the performance capacity of the wireless connection between a base station and the user equipment associated to said ES, without having to actively send any prior requests to the CUC/CNC. Various other applications, even outside of the scope of a method for calculating capabilities of a wireless bridge, are also possible. For example, a plurality of such intercepted messages may be timestamped and stored, forming a time series. Such a time series may allow for example performing an extrapolation or a prediction, at the WB, of a future intended network usage, with the same advantages of a passive, seamless and stealthy integration with respect to the normal operations of the CNC and/or of the CUC.

Of course, other discovery protocols may also be conducted, including standard, well-known discovery protocols, for retrieving end stations identification, for example their IP or MAC addresses.

Optionally, said information related to the intended network usage for time-sensitive communication at the wireless bridge comprises at least one element in a list consisting in a time-sensitive traffic load per (device-side and/or network-side) port, a packet loss rate, a deterministic end-station-to-end-station latency per stream, and a delay per TSN bridge.

The elements of this list are all types of metrics that may be used for determining a QoS template.

Optionally, the method further comprises balancing a performance of the wireless bridge by adjusting a radio resource allocation among a plurality of internal wireless links of the wireless bridge, based on the quality-of-service template.

As a result, it is possible to first determine a desired QoS template, then balance the performance of the wireless bridge in order to match the desired QoS template.

Optionally, calculating the capabilities of the wireless bridge corresponding to the estimated performance capacity comprises calculating a delay based on a performance capacity of a wireless link between a base station and a user equipment.

Such a delay may be a dependent delay, defined as relating to a port pair, consisting for example of the NW port of the UPF and of the DS port of the UE connected by the wireless link. Alternately, such delay may for example be a sum of the above dependent delay and of an independent delay related solely to bridge hardware.

Optionally, the method further comprises transmitting the calculated capabilities of the wireless bridge to another entity of the communication system, in view of managing the time-sensitive network.

For example, the CNC may receive the calculated capabilities of the WB and generate a TSN scheduling on the basis of these calculated capabilities.

Optionally, the method further comprises:
obtaining time-sensitive network scheduling information determined based on said transmitted calculated capabilities,
estimating an adjusted performance capacity of the wireless connection between the at least one base station and the at least one user equipment based on the obtained time-sensitive network scheduling information, and
calculating adjusted capabilities of the wireless bridge corresponding to the estimated performance capacity.

This corresponds to an interactive optimization loop for refinement of the QoS template based on the TSN scheduling information provided by the CNC after receiving the initial TSN capabilities of the WB. Of course, the interactive optimization loop may also account for additional information, such as updated information relating to the intended network usage, which may be used for estimating the adjusted performance capacity of the above wireless connection.

The present disclosure also describes, in another aspect, a communication system within a time-sensitive network comprising a first subnetwork and a second subnetwork, the communication system comprising a wireless bridge and further comprising at least two end stations (ES), the wireless bridge comprising at least one user plane function entity (UPF), at least one base station (gNB) and at least one user equipment (UE), said at least one user plane function entity comprising at least one network-side port (NW) enabling communication between the at least one base station and the first subnetwork, said at least one user equipment being wirelessly connected, within the time-sensitive network, to said at least one base station, said at least one user equipment comprising at least one device-side port (DS) enabling communication with the second subnetwork, at least one of the at least two end stations being connected to a corresponding device-side port of a corresponding user equipment, the wireless bridge being configured for:

estimating a performance capacity of the wireless connection between the at least one base station and the at least one user equipment based on information related to an intended network usage for time-sensitive communication at the wireless bridge, and calculating the capabilities of the wireless bridge corresponding to the estimated performance capacity.

The present disclosure also describes, in other aspects:

a wireless bridge of the above communication system, a computer-readable storage medium comprising instructions which, when executed by a processing unit, cause the processing unit to carry out the method hereby described, a computer program comprising one or more stored sequence/s of instructions that is accessible to a processing unit and which, when executed by the processing unit, causes the processing unit to carry out the method hereby described, and a processing circuit equipped with a processing unit operably connected to a memory, the processing circuit being configured to carry out the method hereby described.

DESCRIPTION OF EMBODIMENTS

Figure 3:
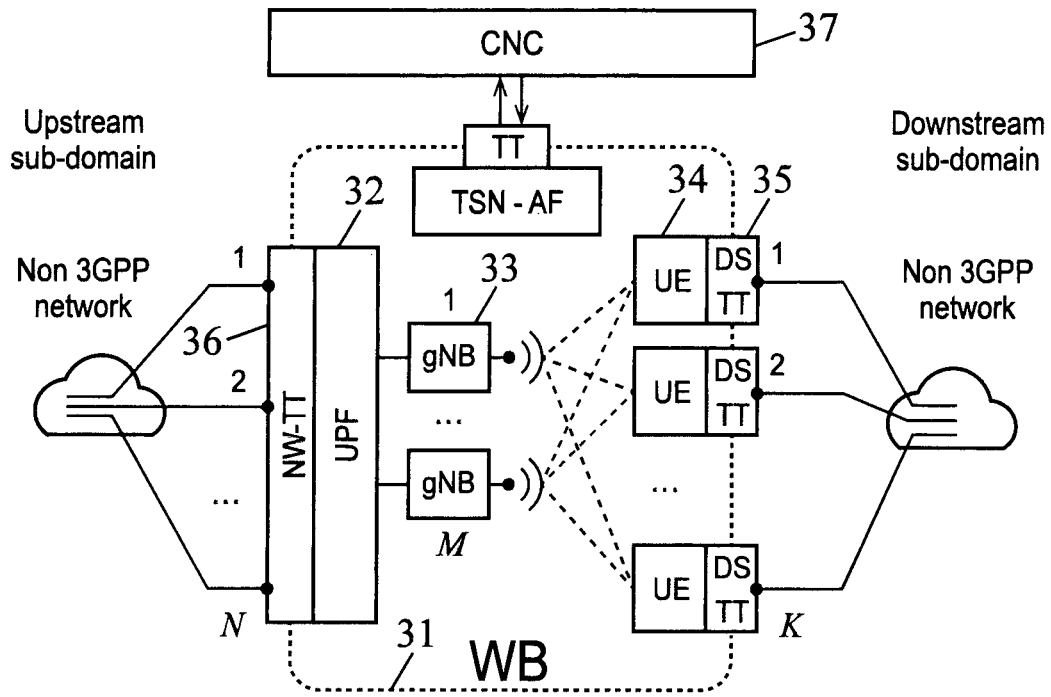
FIG. 3 illustrates a generic model of a wireless bridge according to an exemplary embodiment of the invention.

The present invention relates to a method for calculating the TSN capabilities of a wireless bridge in a TSN network. The wireless bridge (WB) is an entity of the TSN network which function is to connect together, through wireless means, an upstream subnetwork with a downstream subnetwork. An example of a wireless bridge is a 3GPP/5G system. A generic model of a WB is shown in FIG. 3. The WB (31) comprises:

a User Plane Function (UPF) (32) representing a component of a 3GPP 5G core infrastructure system architecture, at least one base station (gNB) (33), and at least one user equipment (UE) (34).

The at least one UE is wirelessly connected to said at least one gNB and is provided with at least one device side (DS) port (35). FIG. 3 represents K such DS ports, where K is any positive integer. The UPF has a wireline connection to said at least one gNB and is typically provided with at least one network side (NW) port (36). FIG. 3 represents N such NW ports, where N is any positive integer. Finally, each port may be provided with a TSN translator (TT), as defined in NPL 1, which purpose is to hide WB internal features from CNC and from other network entities. It is to be noted that some available NW and DS ports may be unused for TS communication and thus shall be skipped from the WB TSN capabilities calculation.

Since it is assumed that the purpose of the TSN network is to allow communication between a plurality of end stations, the TSN network further comprises, in the context of the invention, at least two end stations (ES). In some embodiments, the TSN network may also comprise a Centralized Network Configuration (CNC) entity (37) and/or a Centralized User Configuration (CUC) entity. The latter discovers end stations (ES), reads their user requirements, and configures their TSN features. The former discovers physical topology and TSN capabilities of the network infrastructure (e.g. links and bridges), computes TSN scheduling, and configures TSN features of said bridges according to the TSN scheduling, thus, enabling a desired connectivity for the at least two ESs according to the stream requests obtained directly from ESs or through CUC. Said TSN network may further comprise at least one wired TSN bridge having a fixed configuration in the sense that its TSN capabilities may be characterized by a single set of TSN parameters, e.g. min/max dependent and independent delays per port or per port pair, according to IEEE 802.1Qcc standard.

Figure 1:
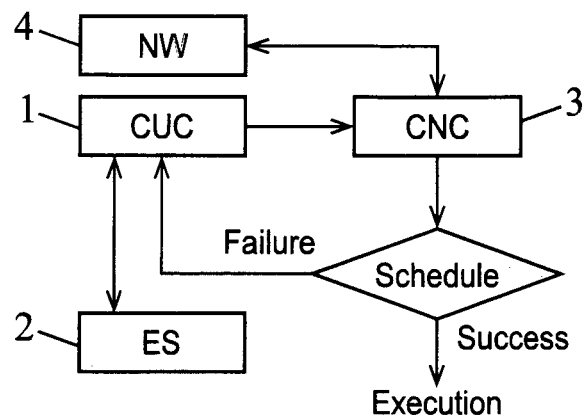
FIG. 1 illustrates a TSN configuration loop corresponding to a fully centralized model, as known from prior art.
Figure 2:
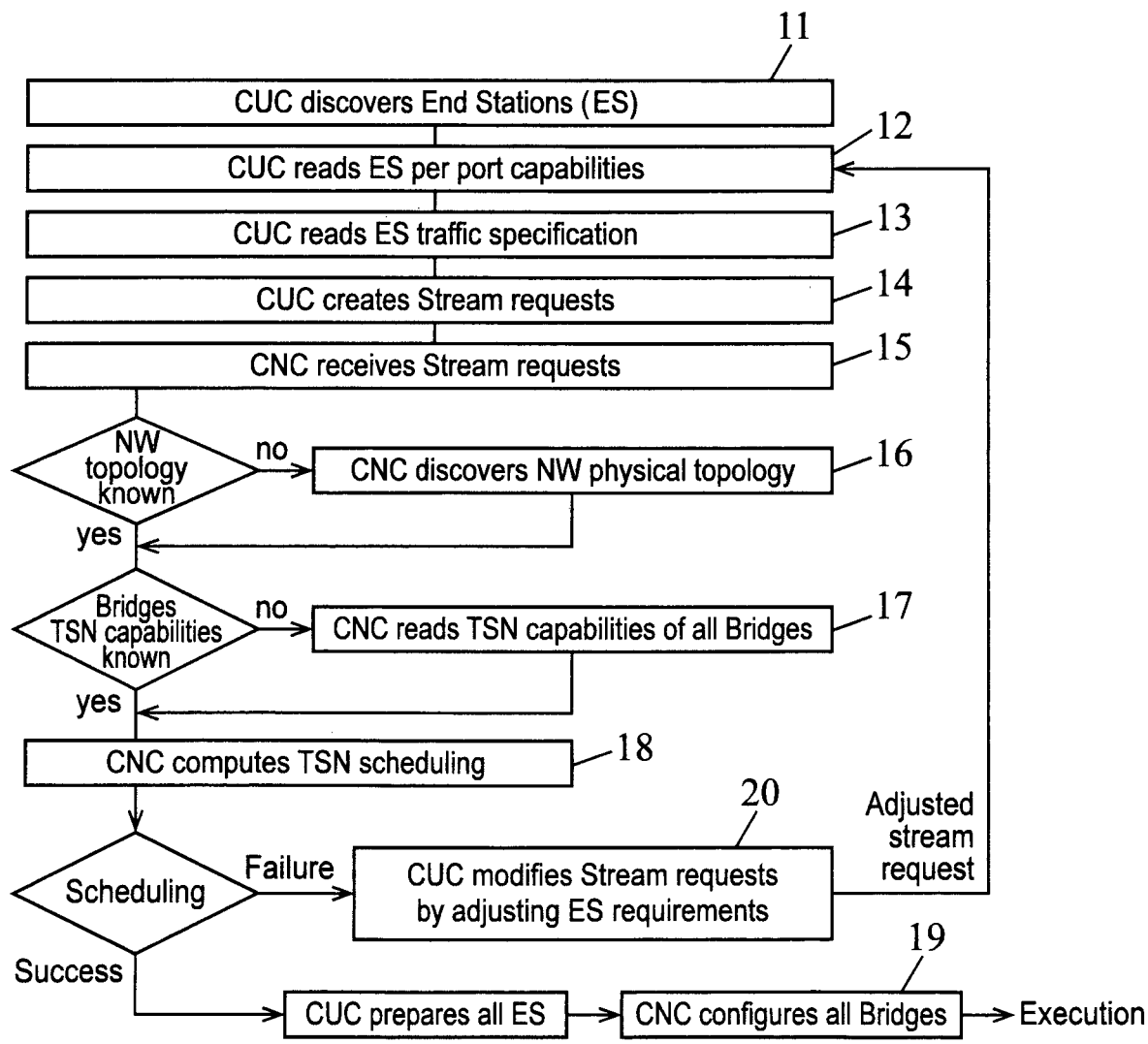
FIG. 2 illustrates a TSN scheduling workflow associated to the TSN configuration loop of FIG. 1, as known from prior art.

Unlike the wired bridges, the WB is characterized in having variable TSN capabilities that may be adjusted on request by tuning internal features of WB related to wireless communication. In particular, this may concern the dependent delay per a port pair related to the throughput capacity of a corresponding wireless link. The dependent delay per a port pair may also be related with the amount of resource which is periodically reserved for transmission and the wireless link quality associated to said transmission. The competition for the radio resource used between UEs results in the interdependent properties of the wireless links: the more resource provided to a given link, the less resources remain for the others. Such agility in the WB throughput capacity per UE potentially allows to adjust the WB performance according to the traffic load and, in such a way, to optimize its performance. However, the established TSN configuration workflow described in FIG. 2 does not provide means for a bridge to obtain relevant information by the time when the bridge is requested to declare its TSN capabilities. This creates the Chicken-Egg problem addressed by the present invention.

The proposed method for calculating the TSN capabilities of a WB is characterized in the following steps executed by WB of:
- obtaining information related to an intended network usage for time-sensitive communication at the wireless bridge,
- optionally, based on the obtained information, generating a quality-of-service template representing a performance metric corresponding to said intended network usage for time-sensitive communication at the wireless bridge,
- estimating a performance capacity of the wireless connection between the at least one base station and the at least one user equipment, based either directly on the obtained information or on the quality-of-service template derived of said information, and
- calculating the TSN capabilities of the wireless bridge corresponding to the estimated performance capacity.

By estimating the performance capacity of the wireless connection between the at least one base station and the at least one user equipment, the method according to the invention resolves the Chicken-Egg problem.

The abovementioned information related to the intended network usage for time-sensitive communication at the wireless bridge may be predicted, either at the WB or at any other entity of the TSN, based on one or more types of retrieved information. For example, the WB, or any other entity of the TSN, may first retrieve information related to the ES within the downstream subnetwork, such as by conducting any standard or known network discovery method, then, based on the retrieved information, predict information related to the intended network usage. The quality of the prediction about the intended network usage for time sensitive (TS) communication at the WB may be improved by using additional types of information that may be related, for example, to ES type, traffic specification, network topology, TSN capabilities of any other network entities (links and bridges) in the TSN network, and/or TSN scheduling. Said additional types of information may be obtained by any available means, either autonomously (through direct communication with other network entities, e.g. ES and bridges) or with a help of CUC and/or CNC.

The obtained information may be directly used to estimate a performance capacity of the wireless connection between the at least one base station and the at least one user equipment, assuming a preset, or preconfigured, radio resource allocation at the WB. Alternately, in some embodiments, once obtained or predicted by the WB, the information related to the intended network usage for time-sensitive communication at the wireless bridge within the downstream subnetwork is used by the WB to generate a Quality of Service (QoS) template. Such QoS template may then be used for balancing the WB performance through adjusting its internal features related to wireless communication. Such adjustment allows WB to use the available radio resources (RR) more efficiently so as to provide an improved performance, in other words an improved throughput capacity, or an improved QoS parameter (such as packet loss rate, latency, or jitter) or set of parameters adapted to the anticipated traffic load. In these embodiments, the obtained information is used to balance the WB performance and optimize the performance capacity of the wireless connection between the at least one base station and the at least one user equipment. In such case, the obtained information is used to estimate an optimized performance capacity of the wireless connection between the at least one base station and the at least one user equipment.

After estimating the (optimized or non-optimized) performance capacity of the wireless connection between the at least one base station and the at least one user equipment, the TSN capabilities of the 5GS bridge may be calculated based on such estimation (e.g. according to IEEE 802.1Qcc standard) and provided to CNC for computing a TSN scheduling for the entire TSN network.

Each step of the method is first explained below referring to a simple exemplary TSN network illustrated in FIG. 4. The method is then generalized for the case of WB comprising more than one base station and being capable of advanced channel coding and time/frequency multiplexing. Finally, two specific minimalistic examples involving a single UE are also provided.

Hereafter is described how to obtain information related to an intended network usage for time-sensitive communication at the wireless bridge. Said information may relate, for example, to a traffic load per DS port.

In this regard, it is assumed that WB divides the TSN network in two subnetworks, or subnetworks. It is further assumed that there is no side-connection between these two subnetworks, in other words, the only connection between these two subnetworks is through the WB. These two subnetworks are arbitrarily referred hereafter as 'upstream' (41) and 'downstream' (42) subnetworks, respectively (FIG. 3), the upstream domain being accessible through the NW ports and the downstream domain being accessible through the DS ports.

Under this assumption, all data flows between a first ES located in the upstream subnetwork and a second ES located in the downstream subnetwork shall pass through WB. Thus, to anticipate the data flow through a DS port, it is sufficient to obtain information about the entities within the corresponding branch of the downstream subnetwork, such entities comprising ES (43) as well as, if present, bridges (44). This is the reason why on FIG. 4 the topology of the upstream domain (41) is not represented in much detail, contrary to the topology of the downstream subnetwork (42), which comprises, in this example, K=3 branches to support M=6 end stations (43). More precisely, in this example, in the downstream subnetwork:
- the first branch comprises a single bridge B1 linked to two end stations ES1 and ES2,
- the second branch comprises a single end station ES3, and
- the third branch comprises a first bridge B2 linked to a first end station ES5 and to a second bridge B3, which itself is further linked to a second and a third end stations ES4 and ES6.

Conversely, to anticipate the data flow through a NW port, it is sufficient to obtain information about ESs within the corresponding branch of the upstream subnetwork.

Although throughout this document, focus is mainly given on traffic load through DS ports and on ES located in the downstream subnetwork, the skilled person will recognize that the same teachings and method steps apply, in the same manner, to traffic load through NW ports and to ES located in the upstream subnetwork.

The information related to ES may be obtained by any known method. For instance, this may be done using proprietary discovery protocols, such as Cisco Discovery Protocol (CDP) or non-proprietary discovery protocols, such as Link Layer Discovery Protocol (LLDP). The latter is a link layer protocol used by network devices for advertising their identity, capabilities, and neighbors on a local area network. Information that may be retrieved using such a protocol comprise system and port names of the network devices as well as their MAC/PHY information and system capabilities.

In the most basic embodiment, it may be assumed that all ESs behave as Talkers and are characterized by identical traffic specifications. In other words, all ES generate data flow characterized by the same bandwidth and all these flows pass through the WB towards the upstream subnetwork comprising the Listeners. Under these assumptions, the traffic load per DS port, noted $L_k^{DS}$, may be defined as a sum of the streams generated by ES located in the corresponding branch of the downstream subnetwork (42):

$$L_k^{DS} = \Sigma_{p=1}^{P_k} L_{kp}^T \qquad (1)$$

where k is a reference number of DS port, $P_k$ is the number of ES in the corresponding branch of the downstream subnetwork connected to k-th DS port, and $L_{kp}^T$ is the data flow generated by p-th ES.

Under assumption that all Talkers are identical, the traffic load per DS port is proportional to the number of ES per branch of the downstream subnetwork, i.e.:

$$L_k^{DS} = \Sigma_{p=1}^{P_k} L_{kp}^T = P_k L^T \qquad (2)=$$

where $L^T$ is an arbitrary defined data flow generated by a Talker.

Finally, the repartition of the traffic load between all DS ports may be defined in a vector form, noted T, as follows:

$$T = \{P_1, P_2, \ldots, P_K\} \qquad (3)$$

Figure 4:
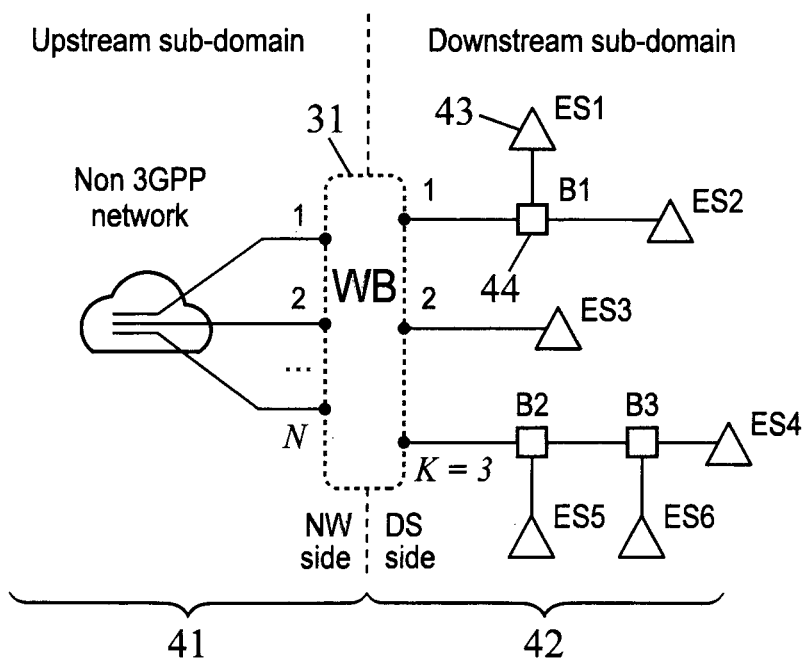
FIG. 4 illustrates a TSN network comprising a WB provided with 3 DS ports, according to an exemplary embodiment of the invention.

As an example, in case of the TSN network shown in FIG. 4, comprising a WB with three DS ports (K=3) and two, one, and three ESs respectively per the corresponding branch of the downstream subnetwork, the anticipated relative traffic load per DS port may be encoded as:

$$T = \{2, 1, 3\} \qquad (4)$$

This relative traffic load per port, here expressed in a matrix form for the sake of concision, may be used as a QoS template for adjusting the WB internal features in a way that may allow for an optimal repartition of RR between UE/DS ports and thus best handle the non-identical traffic load per DS port.

Hereafter is described a possible way, according to some embodiments, of improving prediction quality when predicting information related to the intended network usage for time-sensitive communication at the wireless bridge.

Figure 5:
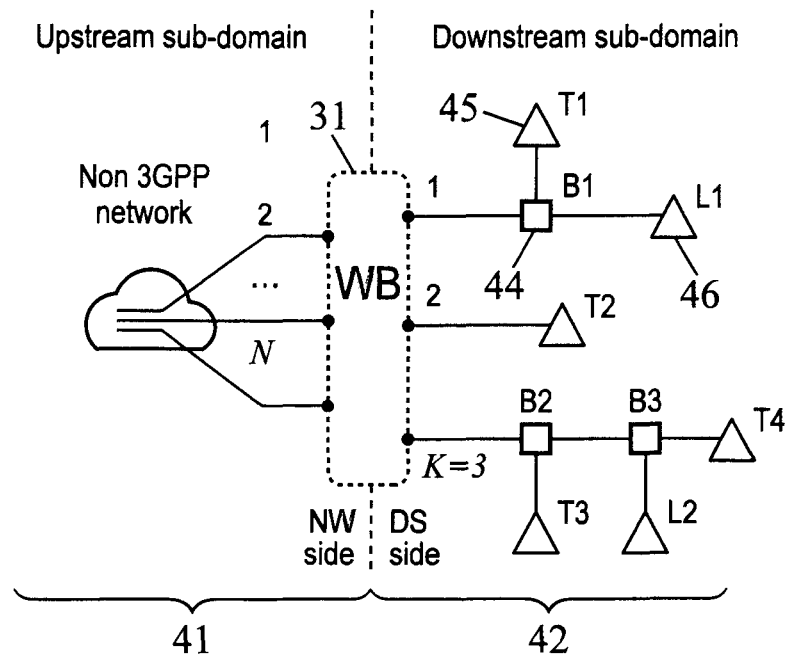
FIG. 5 illustrates a TSN network with ESs located in the downstream subnetwork identified based on their profile as Talkers and Listeners, according to an exemplary embodiment of the invention.

The quality of the prediction about the traffic load per DS port may be improved thanks to collecting additional information related to ES located in the downstream subnetwork (42). In particular, it may be further beneficial to differentiate the ES acting as Talker (T) and Listeners (L). The former (i.e. Talker) is intended to generate on outgoing traffic flow towards a Listener, whereas the latter (i.e. Listener) is intended to receive the incoming traffic flow from a Talker. Such differentiation is illustrated in FIG. 5, which is entirely identical to FIG. 4, to the exception of the end stations (43) either acting as a talker (45) or as a listener (46). Specifically, the end stations (43) labelled ES1, ES3, ES4 and ES5 on FIG. 4 act as talkers (45) and are labelled T1, T2, T3 and T4 on FIG. 5, while the end stations (43) labelled ES2 and ES6 on FIG. 4 act as listeners (46) and are labelled L1 and L2 on FIG. 5.

In some embodiments, the information related to the ES profile may be used to anticipate the traffic load per DS port in the Downlink (DL) and Uplink (UL) modes. Under assumption that all traffic flows go from/to the upstream subnetwork, the anticipated traffic load for DL and UL modes, respectively noted $T^{DL}$ and $T^{UL}$, may be defined for the example of FIG. 5 as $$\begin{cases} T^{DL} = \{1, 0, 1\} \\ T^{UL} = \{1, 1, 2\} \end{cases} \qquad (5)$$

This relative traffic load per DS port may be used as a target template for adjusting the WB internal features in a way that may allow to best handle the non-symmetrical traffic load per DS ports in DL and UL modes, respectively.

In yet another embodiment, it may be further beneficial to obtain information about the traffic specification supported by each ES, which may be used to estimate parameters of the streams to each Listener and from each Talker located in the downstream subnetwork (42) and, consequently the aggregated traffic flows through each DS port in DL and UL modes, respectively:

$$\begin{cases} T^{DL} = \left\{ \sum_{p=1}^{P_k^L} L_{kp}^L \right\} \text{ for } k = 1, 2, \ldots, K \\ T^{UL} = \left\{ \sum_{p=1}^{P_k^T} L_{kp}^T \right\} \text{ for } k = 1, 2, \ldots, K \end{cases} \qquad (6)$$

where $P_k^L$ and $P_k^T$ are the numbers of Listeners (L) and Talkers (T) in the k-th branch of the downstream subnetwork, respectively, and $L_{kp}^L$ and $L_{kp}^T$ is the bandwidth of the streams received/transmitted by said L/T end stations, respectively.

In case of the exemplary TSN network illustrated in FIG. 5, this corresponds to:

$$\begin{cases} T^{DL} = \{L_{11}^L, 0, L_{31}^L\} \\ T^{UL} = \{L_{11}^T, L_{21}^T, L_{31}^T + L_{32}^T\} \end{cases} \qquad (7)$$

where $L_{11}^L$ and $L_{31}^L$ are the respective bandwidths of the streams received by L1 and L2 and $L_{11}^T$, $L_{12}^T$, $L_{31}^T$, and $L_{32}^L$ are the respective bandwidths of the streams transmitted by T1, T2, T3 and T4.

The reparation of the traffic load (that is proportional to the stream bandwidth) per DS port in Eqn. (7) may be used as a refined template for adjusting the internal features of 5GS in a way that may allow to better handle the traffic load per DS ports in DL and UL modes, respectively.

Having exhaustive information about all TS stream requests may also be used to identify the specific case when both T and L end stations associated with the same stream are located within the downstream subnetwork. If the stream path between the pair of T and L does not pass through the WB (e.g. as observed in FIG. 5 for T1 and L1 that, in some embodiments, may constitute a pair of devices communicating in between through B1 bridge) then these two ESs may be excluded from the WB traffic load template.

Alternatively, if the stream path between a pair of T and L do pass through WB (e.g. as observed in FIG. 5 for T2 and L2 that in one embodiment may constitute a pair of devices communicating through WB) then this traffic flow may be represented as a sequence of UL and DL streams from T2 to WB/UPF and from WB/UPF to L2 with an appropriate time multiplexing between the two events.

Finally, the knowledge of all ES that actually needs TS communication may help identify the ESs operating in the best effort (BE) mode, which traffic may be served on a lower priority basis and thus may be excluded from the WB performance template used for calculating its TSN capabilities. Differentiation between TS and BE-type ES may be done, for instance, by matching the list of MAC addresses of TS-type ES obtained from CUC with the list of MAC addresses of all devices located in the downstream subnetwork discovered using LLDP protocol or any other discovery protocol.

Hereafter is defined the quality-of-service (QoS) template that may be generated at the WB based on the information related to the intended network usage for time-sensitive communication at the wireless bridge. The QoS template represents a performance metric corresponding to said intended network usage for time-sensitive communication at the wireless bridge.

Several examples of QoS template have already been introduced in Eqns. 3-7, the performance metric being, in these examples, a traffic load. These examples may be further generalized for other performance metrics associated with individual streams and/or aggregated data flows, such as:
packet loss rate,
end-to-end (e2e) delay or latency, and
any combination of the aforementioned metrics typically referred as quality-of-service (QoS).

Such a multi-criterion QoS template may be then defined as:

$$\begin{cases} T^{DL} = \{Q_1^D, D_2^D, \dots, Q_K^D\} \\ T^{UL} = \{Q_1^U, Q_2^U, \dots, Q_K^U\} \end{cases} \quad (8)$$

where $Q_k^D$ and $Q_k^U$ (k=1, 2, ..., K) each represent a respective QoS requirement per individual stream or aggregated data flow passing through the k-th DS port of WB in DL and UL modes.

Such a QoS Template may be used for multi-objective optimization of the WB performance aimed at improving its capabilities for handling the actual traffic load with a guaranteed QoS (e.g. in terms of packet loss rate) and reducing the bridge delays in order to satisfy the maximum allowed e2e latency per individual streams.

To achieve the latter goal (i.e. minimizing the e2e latency), the priority in radio resource allocation may be provided to a stream that has the lowest quality of wireless link, has a tighter requirement on e2e latency (e.g. retrieved from the stream request), and/or a longer network path (e.g. retrieved from information related to TSN scheduling and network physical topology).

Finally, it is worth mentioning that the QoS template may be further defined and applied taking into account different traffic classes that may be used to prioritize some streams over the others. This may be done by defining a template for each traffic class, which is a straightforward generalization of the proposed method.

Hereafter are described different possibilities for obtaining information related to ES.

The information related to ES profile (talker/listener), traffic type (TS/BE) and traffic specification may be obtained:

via direct communication between WB and ES using, for instance, one of the methods proposed in IEEE 802.1Q and IEEE 802.1Qcc standards for discovery and readout of TSN capabilities of ES by CUC (in case of the centralized TSN network) or by a TSN bridge (in case of the distributed TSN network). In the former case, said information related to ES may be obtained in a form of a list of stream requests comprising information about MAC addresses of all ES within the entire TSN network, their profiles, and traffic specification defined, for instance, in terms of ES operation intervals, number of frames per interval, frame size, and possible transmission offsets and jitters, or any other data that allows to estimate the stream bandwidth (typically defined in terms of Mbps, same as the traffic load) and to compute the TSN scheduling.

Alternatively, this information may be obtained at least partly from another network entity. For instance, it may be obtained:
from CUC that is used in centralized TSN networks to collect and process information related to ESs in order to generate stream requests used as initial (or adjusted) requirement for TSN scheduling to be generated by CNC, or
from CNC that receives information related to ES and the stream requests from CUC in order to compute said TSN scheduling for the entire TSN network.

In yet another embodiment, this information may be obtained by intercepting communications between ES and other network entities (e.g. CUC) that pass through WB.

Hereafter are described different scenarios of how to balance WB performance characteristics according to a QoS template.

For simplicity, let's first consider a WB (31), as illustrated in FIG. 3, comprising only one gNB (33) (M=1) and wherein each UE (34) is provided with only one DS port (35). Under this assumption, the traffic load per DS port may be directly mapped to the payload of wireless links between the UEs and the gNB. Moreover, the bridge TSN parameters that are typically defined for port pairs, may be instead assigned for DS ports (or for UEs). Thus, to best satisfy a given payload per DS port, the relative link capacity per wireless link shall correspond to the QoS template defining the anticipated traffic flow per DS port and/or per stream. For instance, in case of the most basic embodiment with all identical ES acting as Talkers, which anticipated traffic load is described by Eqn. (3), the relative capacities of the WB wireless links may also be defined as a function of the number of ES per branch of the downstream subnetwork connected to the corresponding DS port.

The adjustment of the wireless link capacity of a WB according to a QoS template is possible thanks to the interdependence between said wireless links, which is the intrinsic feature of a wireless communication system. Unlike wireline connections, all wireless links pass through the shared wireless medium typically characterized in terms of a radio channel, which overall capacity depends on the available frequency band and resource allocation in time and frequency used by UEs. To avoid collisions, the overall capacity is shared between all UEs. An appropriate time/frequency and spatial multiplexing approaches and/or interference mitigation methods are used to allow at least a partial reuse of the limited radio resource (RR) that allows to enlarge the overall capacity of the radio channel.

Hereafter, unless specifically mentioned, it is referred to a simplest case of time multiplexing. Generalization of this basic definition towards more advanced methods of RR allocation does not change, however, the logic of the proposed method.

In a general case, the throughput capacity, noted $C_k$, of a wireless link between a base station (gNB) and the kth UE, also noted UE(k), may be defined as follows:

$$\begin{cases} C_k = \alpha_k * R_\Sigma * \eta_k \\ \sum \alpha_k = 1 \end{cases} \quad (9)$$

where $R_\Sigma$ is the overall available RR, $\alpha_k$ is a portion of the overall RR allocated to UE(k), and $\eta_k$ is efficiency of using said portion of RR by UE(k) that is a function of the RR allocation scheme and radio channel properties. Such a definition allows to resolve the resource allocation problem according to a desired repartition of the wireless links capacities.

In one embodiment characterized in either equal anticipated traffic load per. DS port or unknown traffic load per DS port, the RR allocation problem may be formulated and resolved towards the equal throughput capacity provided to all UEs. The corresponding optimization problem may be formulated as maximization of the minimum link capacity, i.e.

$$\begin{cases} \max(\min(\alpha_k * \eta_k)) \\ \sum \alpha_k = 1 \end{cases} \quad (10)$$

and resolved by a variety of available analytical and numerical approaches with respect to an optimal repartition of RR between UEs ($\alpha_k$) for a given set of values of the UE efficiencies enabled by different resource allocation schemes supported by the corresponding UEs.

The solution of Eqn. (10) may also be used as a default configuration of a wireless bridge that may be applied having no information about the WB intended use. Moreover, it may be considered as a first step of the WB balancing procedure aimed at determining a reference radio resource allocation leading to a fair sharing of the available RR and equal throughput capacity for all UEs.

The same balancing procedure may further be applied for a given repartition of the traffic load per DS port. For instance, if said traffic load repartition is defined by Eqn. (3) corresponding to the most basic embodiment, the above optimization problem may be rewritten as follows:

$$\begin{cases} \max(\min(\alpha_k * \eta_k / P_k)) \\ \sum \alpha_k = 1 \end{cases} \quad (11)$$

where $P_k$ is the number of ESs in the branch of the downstream subnetwork connected to the k-th DS port.

In another embodiment wherein the traffic load per DS port, noted $L_k$, is already known or anticipated, the optimization problem may be rewritten as follows:

$$\begin{cases} \max(\min(\alpha_k * \eta_k / L_k)) \\ \sum \alpha_k = 1 \\ C_k \geq L_k \end{cases} \quad (12)$$

where $C_k$ is the estimated wireless link capacity defined by Eqn. (9).

The optimization problem may be further generalized for a number of scenarios that allows splitting the optimization problem in two (or more) independent optimization problems such as:
UL and DL modes (similarly to the case described by Eqn. 7), and/or
different traffic priorities, and/or
dual frequency connectivity.

In all this cases, the optimization problem may be split in at least two independent optimization problems formulated and resolved separately with respect to the traffic load per DS port for each mode, e.g. for DL mode, only traffic of the same priority, and RR corresponding to one selected frequency sub-band.

Finally, the same approach may be used to deal with multi-objective optimization problems corresponding to any of the following scenarios and the like introduced below, e.g.:
multi-criterion QoS optimization templates in definition of the WB performance metrics comprising at least two different criteria (e.g. traffic load and packet loss rate), and/or
the WB comprising more than one base station (M>1), and/or
advanced time/frequency/spatial multiplexing for RR allocation to allow frequency reuse.

Multi-criterion optimization using QoS templates is hereafter further discussed. It shall be noted that QoS templates may take into account, in addition to the traffic load, some other performance metrics, such as packet loss rate and deterministic e2e latency. These additional criteria may therefore be included in the optimization problem formulation. For instance, this may be done as follows:

$$C_k / L_k \geq R^{PL} \quad (13)$$

where $R^{PL}$ is a threshold of the packet loss rate due to overflow of the link capacity, and $$D_d(C_k, L_k) \leq D_d^{max} \quad (14)$$

where $D_d$ ($C_k, L_k$) is the WB delay dependent on the ratio between the traffic load and wireless link capacity, and $D_d^{max}$ is its maximum allowed value estimated, for instance, as a partial contribution of WB into the bounded e2e latency defined for the corresponding stream(s) passing through the DS port.

Of course, these simple examples may be elaborated further to better describe the realistic PHY/MAC level features and techniques available for improving QoS of a wireless network, such as radio channel properties variation due to the interference, shadowing and multi-path propagation as well as the beam-forming, interference mitigation, channel coding and adaptive redundancy being the known methods for QoS control. These features shall be reflected in the definition of a Figure of Merit (FoM) used to guide the optimization problem, but they do not change the proposed method aimed at definition of the reference solution (defined in the form of the QoS template representing the anticipated traffic load and, optionally, additional QoS optimization criteria) that may be used with any single- or multi-parameter FoM function.

In exemplary embodiments, the additional optimization criteria, such as Eqn. (13) and (14), may be considered together with the optimization problem formulated by Eqn. (11) or (12) in order

- to limit the search space by restricting the pool of allowed values of the optimization parameters, or
- to formulate a vector-type multi-objective optimization problem aimed at simultaneous improvement of at least two dependent or independent figure of merit (FoM) functions describing a sought metric of the WB performance, e.g. throughput capacity per port and packet loss rate per stream.

The former case may be effectively resolved by a genetic algorithm (GA) that allows to search & find the global maximum of discrete and piecewise multi-extremum FoM functions, that is difficult or not possible using brute-force and gradient-type methods. Hybrid GA methods, such as defined for example in NPL 2, may further be used to boost the algorithm success and convergence rates.

The latter may be effectively resolved by multi-objective optimization methods commonly referred as Pareto optimization that allow to find a set of solutions providing an acceptable trade-off between competing FoM functions.

Finally, advanced optimization methods, such as defined for example in NPL 3, may be used to overcome possible issues with uncertainty in the definition of the initial variation range of the optimization parameters.

Hereafter is discussed a general case where the WB as illustrated in FIG. 3 comprises more than one base station (M>1). A plurality of base stations allow enlarging the coverage area of the wireless network without increasing the signal level. Moreover, different gNBs may reuse at least part of the available RR when communicating with UEs, provided said gNBs or said UEs are located far enough from each other and/or are capable of spatial multiplexing (e.g. via beam forming).

Figure 6:
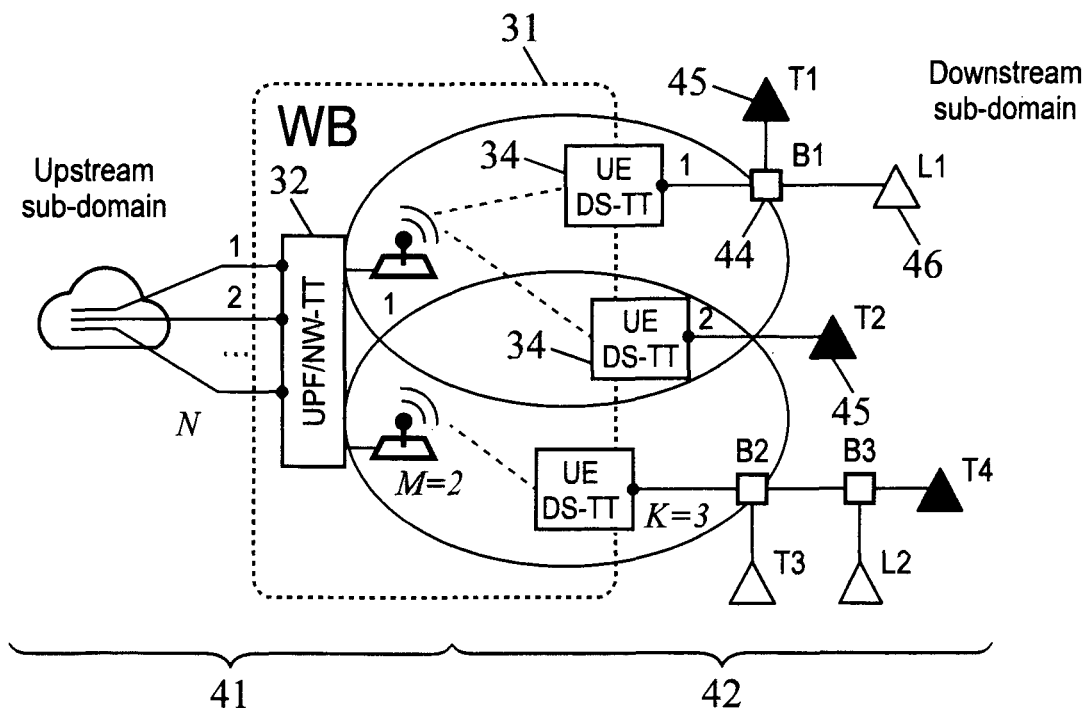
FIG. 6 illustrates a TSN network comprising WB with 2 base stations having a partly overlapping coverage zone and 3 UEs with one of those 3 UEs located within the overlapping coverage zone, according to an exemplary embodiment of the invention.

In some embodiments, it may be thus beneficial to first balance the traffic load between gNBs and then between UEs in each group associated with each gNB. Referring to the exemplary TSN network in FIG. 5, the procedure and its outcome may look as shown in FIG. 6. Such a network topology may be derived using the following procedure.

Firstly, the traffic load per UE/DS port is anticipated, for instance, based on the number of ES, similarly as in Eqn. (3). Then, the anticipated traffic load per base station is to be balanced, for instance, by maximizing the minimum load per gNB:

$$\max(\min(L_m^{gNB})) \quad (15)$$

where $L_m^{gNB}=\Sigma_k^{K_m} L_k^{DS}$ is the traffic load per gNB, m is an integer from 1 to M designating a given base station (33), M is the total number of base stations (33) (e.g. M=2 in FIG. 6) and $K_m$ is a subset of a sequence of integers from 1 to K representing the list of UEs (34) assigned to a corresponding base station among the M base stations, such that $\Sigma K_m$=K. As such, considering a given base station (33), noted m-th gNB, the corresponding traffic load is balanced between the $K_m$ UEs (34) associated with said m-th gNB.

Still referring to FIG. 6, in the most basic embodiment where the traffic load is defined solely based on the number of ESs (45, 46), the aforementioned procedure results in the following repartition of the load between the gNBs:

$$\begin{cases} T^{gNB} = \{3, 3\} \\ T_1^{UE} = \{2, 1\} \\ T_2^{UE} = \{1\} \end{cases} \quad (16)$$

where $T^{gNB}$ is the repartition of the load between the M=2 gNBs and $T_m^{UE}$ corresponds to the relative traffic load per UE/DS port associated with the corresponding m-th gNB. It shall be noted, for example, that in the case of the second gNB (m=2) represented by $T_2^{UE}$, only one wireless link is supported, which means that the entire capacity of said second gNB may be provided for the corresponding UE/DS port.

The above procedure may be generalized taking into account the actual traffic specification for each ES, similarly as it is done in Eqn. (7). If necessary, a handover of UE(2) between gNB(1) and gNB(2) may be done to balance the traffic load per gNB, thanks to the advantageous location of UE(2) within the overlapping zone characterized in having a sufficient signal level for establishing reliable communication link with both gNBs (the coverage area of each gNB is schematically represented in FIG. 6 by a shadowed area).

The above procedure for balancing the load per gNB may be generalized to account for the DL/UL operation modes, for different traffic types and for different use scenarios as discussed above for the UE/DS load.

Finally, it is worth being mentioned that the above procedure should preferably be applied under the condition of a negligible interference level between gNBs. Such condition is met if at least one of the following is true:
- each gNB is provided with a portion of the overall RR such that $(\Sigma_{m=1}^M R_m = R_\Sigma)$, so that there is no competition between the gNB for a given radio resource, or
- the gNBs reuse at least partly the same RR but are located far enough to guarantee an acceptable signal to interference (SIR) ratio for each other and associated UEs, or
- each gNB and associated UEs are capable of interference mitigation and/or multiplexing, e.g. based on spatial beam-forming, MIMO, OFDM or any other methods that helps minimizing the mutual impact between devices sharing the same RR to an acceptable level.

If, on the contrary, the reuse of RR by gNBs leads to a non-negligible level of interference, then the optimization problem may be formulated in the most generic way with respect to all the involved entities (i.e. gNBs and UEs) and the full set of optimization parameters related to the resource repartition ($\alpha_k$), to UEs efficiency in RR usage ($\eta_k$), and to the overall RR may be scaled up or down depending on the capabilities of gNBs and UEs for RR reuse and interference mitigation.

To reduce the computational complexity of the RR allocation optimization problem in its generic formulation, it is strongly recommended to follow the teaching of this invention that allows to obtain a quick and reasonable prediction of the WB intended use in a TSN network, without solving the computationally-heavy and often ill-posed multi-parameter and multi-objective optimization problem. This makes the proposed method attractive for algorithms that may be run on the nodes having limited computational power.

Hereafter are presented some exemplary implementations of the method according to the invention. For the sake of simplicity, these implementations are described in communications systems comprising as few entities as possible.

Figure 7:
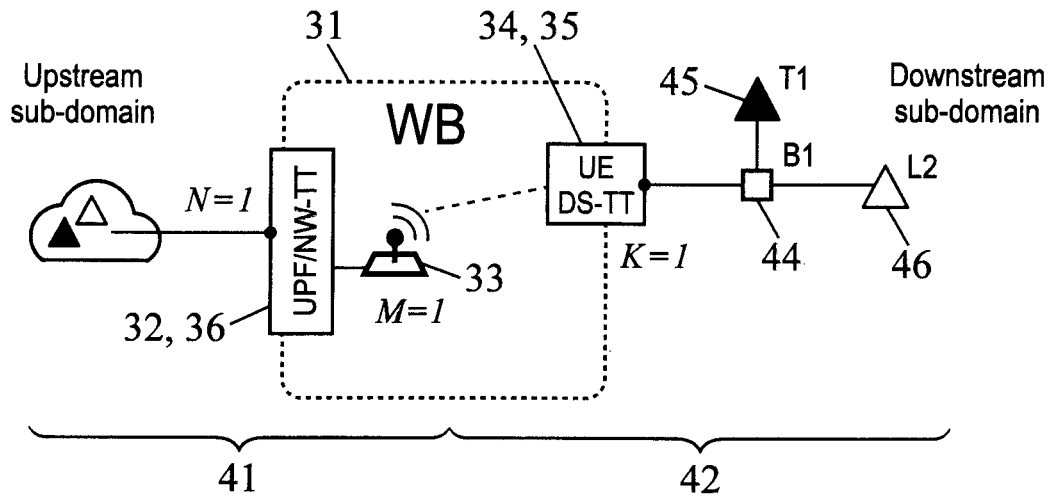
FIG. 7 illustrates a TSN network comprising only 1 UE, according to an exemplary embodiment of the invention.

FIG. 7 represents an exemplary embodiment of a TSN network comprising:
- a WB (31) comprising a single UE (34), a single UPF (32) with a single NW port (36), a single DS port (35), and a bridge (44) and two ESs in the downstream subnetwork (42), e.g. a Talker (45) and a Listener (46), which pairs are located in the upstream subnetwork (41).

Although in this embodiment there is only one wireless link available between the only gNB and the only UE, the proposed method for calculating the WB TSN capabilities may still be applied. Indeed, the throughput capacity of this single wireless link may still be shared, for example between a DL and a UL mode, for example via time multiplexing. Assuming that the downstream subnetwork (42) comprises a Talker and a Listener (as illustrated in FIG. 7), and having no additional information except about the presence and type of these two ESs, one may decide to share the available RR equally between DL and UL modes. For instance, this may be done via time domain or frequency multiplexing. The corresponding QoS template and throughput capacities may be formulated as:

$$\begin{cases} T^{DL} = \{1\} \\ T^{UL} = \{1\} \end{cases} \quad (17)$$

$$C_k^{UL} = C_k^{DL} = C_\Sigma/2 \quad (18)$$

where $C_k$ and $C_k^{DL}$ are the portions of the wireless link capacity in the UL and in the DL mode respectively, and C E refers to the total throughput capacity $C_k$ of the wireless link as defined by Eqn. (9).

Similarly, as already explained referring to the exemplary embodiment in FIG. 4, this example may be further adjusted for the case of a known traffic specification defined for each ES and/or for a QoS Template comprising additional performance metrics, such as packet loss rate.

Finally, one may assume that the two ESs in FIG. 7 represent the only one ES located in the downstream subnetwork that operates sequentially in the DL and UL modes. The model still holds under this assumption.

Figure 8:
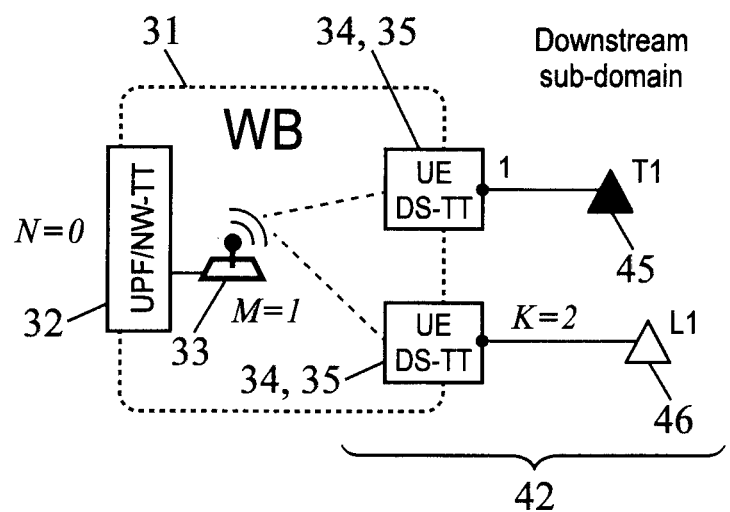
FIG. 8 illustrates a TSN network comprising 1 gNB, 2 UEs, and 2 ESs located in the downstream subnetwork, according to an exemplary embodiment of the invention.

FIG. 8 illustrates an exemplary embodiment of a TSN network comprising:
  a WB (31) comprising a UPF (32) with none of its NW-ports being used for TS communication, a single gNB (33) and two UE (34), each of the UE having a DS port (35),
  and two ESs (45, 46) both located in the downstream subnetwork (42), that communicate with each other through the WB (31).

The peculiarity of this example is that it does not account for any ES located in the upstream subnetwork. However, the proposed method for calculating the TSN capability of the WB may still be applied to compute and optimize the RR allocation between the two UEs operating in the UL and DL modes, respectively.

Hereafter is described how to compute the TSN capabilities. The final step of the proposed method consists in converting the internal settings of the WB related to wireless communication into TSN capabilities, which represent, for other network entities, an understandable form of these internal settings of the WB. This step is not essential for application of the proposed method, but may be necessary to enable interoperability of a WB (e.g. 3GPP/5GS) with a wired TSN network, e.g. operating under IEEE 802.1Q or Qcc.

According to IEEE 802.1Qcc standard, the TSN capabilities of a bridge comprise a parameter describing the bridge delay dependent on the frame size, referred as dependent delay, $D_d$. This parameter is typically defined per port pair and per traffic type as defined by IEEE 802.1Qcc standard, and is equal to the inverse of the throughput capacity of a link connecting two adjacent components:

$$D_d(n,k) = \text{FrameSize}/C_{nk}^{min} \quad (19)$$

where $C_{nk}^{min}$ in is the minimum link capacity on the path between the n-th ingress port of a first TSN bridge and an ingress port of an adjacent component connected by a cable to the k-th egress port of said first bridge.

In case of a WB, the minimum link capacity (i.e. the bottleneck) is typically associated with the wireless link. Because of this, the dependent delay per port pair of a WB ($D_d^{WB}$) may be defined based on the wireless links capacity:

$$D_d^{WB}(n,k) = \text{FrameSize}/C_k \quad (20)$$

where $C_k$ is the throughput capacity of the wireless links between a gNB and UE(k) defined by Eqn. (9) with appropriate $\alpha_k$ and $\eta_k$ parameter values determined by solving the corresponding optimization problem, e.g. such as defined by Eqn. (10) or (12) that may be combined with additional optimization criteria related to the QoS, e.g. defined by Eqn. (13).

It shall be noted that the right-hand side of Eqn. (20) does not contain reference to the NW-port. This is because in this example, the wireless link that is responsible for the bottleneck is associated with a gNB/UE pair (and not with a UPF/NW pair).

In line with the definition provided in IEEE 802.1Qcc standard, the overall delay per port pair may be then calculated as a sum of an independent delay (related to the Bridge hardware) and of a dependent delay defined by Eqn. (20).

In an embodiment, the step of TSN computation may be repeated after receiving the TSN scheduling from CNC.

To do so, an optimization loop may be added for adjusting the Template based on additional information obtained after declaration of the initial TSN capabilities. This may be done when the WB receives the TSN scheduling computed by the CNC based on its initial declaration. The information related to the scheduling typically comprises per port scheduling and per stream information, as defined by IEEE 802.1Qbv and IEEE 802.1Qcc standards, that may be used by the WB to determine
  the list of streams that actually pass through the WB,
  an identification (e.g. the MAC addresses) of the concerned ESs located in the downstream subnetwork, or
  a an internal per-stream routing information (e.g. ingress and egress ports of the WB for a given stream),
  the actual traffic load per stream/per port/per traffic class/per ES.

Based on this information, the QoS template may be adjusted according to the teaching of this invention as described above and used to re-compute the WB TSN capabilities.

The new TSN capabilities may then be provided to the CNC for adjusting the TSN scheduling, if necessary.

The invention claimed is:

1. A method for calculating capabilities of a wireless bridge in a communication system within a time-sensitive network comprising a first subnetwork and a second subnetwork, the communication system comprising the wireless bridge and further comprising at least two end stations,
  the wireless bridge comprising at least one user plane function entity, at least one base station and at least one user equipment,
  said at least one user plane function entity comprising at least one network-side port enabling communication between the at least one base station and the first subnetwork,
  said at least one user equipment being wirelessly connected, to said at least one base station,
  said at least one user equipment comprising at least one device-side port enabling communication with the second subnetwork, at least one of the at least two end stations being connected to a corresponding device-side port of a corresponding user equipment,
wherein said method is performed at the wireless bridge and comprises:
  estimating a performance capacity of the wireless connection between the at least one base station and the at least one user equipment based on information related to an intended network usage for time-sensitive communication at the wireless bridge, and
  calculating the Time Sensitive Networking (TSN) capabilities of the wireless bridge corresponding to the estimated performance capacity.

2. The method according to claim 1, wherein estimating a performance capacity of the wireless connection between the at least one base station and the at least one user equipment based on information related to an intended network usage for time-sensitive communication at the wireless bridge comprises:
  obtaining the information related to the intended network usage for time-sensitive communication at the wireless bridge,
  based on the obtained information, generating a quality-of-service template representing a performance metric corresponding to said intended network usage for time-sensitive communication at the wireless bridge, and
  estimating the performance capacity of the wireless connection between the at least one base station and the at least one user equipment based on the generated quality-of service-template.

3. The method according to claim 2, further comprising, for at least one port, determining a performance indicator associated to said port in at least one operation mode, and wherein generating the quality-of-service template is further based on each determined performance indicator.

4. The method according to claim 1, the time-sensitive network further supporting a centralized user configuration entity configured to communicate with the end stations, the method further comprising obtaining at least part of said information related to the intended network usage for time-sensitive communication at the wireless bridge based on a communication between the wireless bridge entity acting as the centralized user configuration entity and at least one of the end stations.

5. The method according to claim 1, the time-sensitive network further supporting a centralized network configuration entity configured to perform network discovery according to the centralized TSN model, the method further comprising obtaining at least part of said information related to the intended network usage for time-sensitive communication at the wireless bridge based on a network discovery made by the wireless bridge acting as the centralized network configuration entity.

6. The method according to claim 1, the time-sensitive network further comprising a plurality of TSN bridges connecting the end stations to the wireless bridge, at least one of said TSN bridges being configured to perform network discovery according to the distributed TSN model, the method further comprising obtaining at least part of said information related to the intended network usage for time-sensitive communication at the wireless bridge based on said network discovery.

7. The method according to claim 1, wherein obtaining at least part of said information is by receiving a communication emitted by the configuration entity and destined to the wireless bridge.

8. The method according to claim 1, wherein obtaining at least part of said information is by intercepting a communication emitted by the configuration entity and destined to at least one end station.

9. The method according to claim 1, wherein said information related to the intended network usage for time-sensitive communication at the wireless bridge comprises at least one element in a list consisting in a time-sensitive traffic load per port, a packet loss rate, a deterministic end-station-to-end-station latency per stream, and a delay per TSN bridge.

10. The method according to claim 2, further comprising balancing a performance of the wireless bridge by adjusting a radio resource allocation among a plurality of internal wireless links of the wireless bridge, based on the quality-of-service template.

11. The method according to claim 1, wherein calculating the capabilities of the wireless bridge corresponding to the estimated performance capacity comprises calculating a delay based on a performance capacity of a wireless link between a base station and a user equipment.

12. The method according to claim 1, further comprising transmitting the calculated capabilities of the wireless bridge to another entity of the communication system, in view of managing the time-sensitive network.

13. The method according to claim 12, further comprising:
  obtaining time-sensitive network scheduling information determined based on said transmitted calculated capabilities,
  estimating an adjusted performance capacity of the wireless connection between the at least one base station and the at least one user equipment based on the obtained time-sensitive network scheduling information, and
  calculating adjusted capabilities of the wireless bridge corresponding to the estimated performance capacity.

14. A communication system within a time-sensitive network comprising a first subnetwork and a second subnetwork, the communication system comprising:
  a wireless bridge including processing circuitry; and
  at least two end stations, wherein
  the wireless bridge comprises at least one user plane function entity, at least one base station and at least one user equipment,
  said at least one user plane function entity comprises at least one network-side port enabling communication between the at least one base station and the first subnetwork,
  said at least one user equipment is wirelessly connected, within the time-sensitive network, to said at least one base station, said at least one user equipment comprises at least one device-side port enabling communication with the second subnetwork, at least one of the at least two end stations are connected to a corresponding device-side port of a corresponding user equipment, the wireless bridge is configured for:

estimating a performance capacity of the wireless connection between the at least one base station and the at least one user equipment based on information related to an intended network usage for time-sensitive communication at the wireless bridge, and calculating the capabilities of the wireless bridge corresponding to the estimated performance capacity.

15. A wireless bridge of the communication system according to claim 14.

* * * * *